United States Patent
Donald

(10) Patent No.: US 6,950,774 B2
(45) Date of Patent: Sep. 27, 2005

(54) OUT-OF-POCKET DETECTION SYSTEM USING WAFER ROTATION AS AN INDICATOR

(75) Inventor: James J. Donald, Phoenix, AZ (US)

(73) Assignee: ASM America, Inc., Phoenix, AZ (US)

( * ) Notice: Subject to any disclaimer, the term of this patent is extended or adjusted under 35 U.S.C. 154(b) by 0 days.

(21) Appl. No.: 10/347,779

(22) Filed: Jan. 16, 2003

(65) Prior Publication Data

US 2004/0143412 A1 Jul. 22, 2004

(51) Int. Cl.$^7$ .............................................. G01C 17/00
(52) U.S. Cl. ...................................... 702/150; 118/715
(58) Field of Search .................................. 702/150, 183, 702/94, 155, 118; 118/715; 73/724; 250/22.1, 548; 356/401, 500; 438/92, 197; 283/36

(56) References Cited

U.S. PATENT DOCUMENTS

| | | | |
|---|---|---|---|
| 4,618,292 A | 10/1986 | Judge et al. | |
| 5,264,918 A | 11/1993 | Kagami | |
| 5,631,171 A * | 5/1997 | Sandstrom et al. | ......... 436/518 |
| 5,729,337 A | 3/1998 | Tanaka | |
| 5,768,125 A | 6/1998 | Zinger et al. | |
| 5,844,683 A | 12/1998 | Pavloski et al. | |
| 5,885,353 A | 3/1999 | Strodtbeck et al. | |
| 5,961,169 A | 10/1999 | Kalenian et al. | |
| 6,051,074 A | 4/2000 | Strodtbeck et al. | |
| 6,082,950 A | 7/2000 | Altwood et al. | |
| 6,086,064 A | 7/2000 | Biegelsen et al. | |
| 6,090,209 A | 7/2000 | Strodtbeck et al. | |
| 6,099,596 A | 8/2000 | Li et al. | |
| 6,131,589 A | 10/2000 | Vogtmann et al. | |
| 6,167,322 A | 12/2000 | Holbrooks | |
| 6,197,117 B1 * | 3/2001 | Li et al. | ...................... 118/715 |
| 6,220,945 B1 | 4/2001 | Hirokawa et al. | |
| 6,267,642 B1 | 7/2001 | Vogtmann et al. | |
| 6,280,291 B1 | 8/2001 | Gromko et al. | |
| 6,332,116 B1 * | 12/2001 | Qian et al. | .................. 702/183 |
| 6,728,596 B1 * | 4/2004 | Lindseth | ..................... 700/213 |
| 6,771,374 B1 * | 8/2004 | Rangarajan et al. | ......... 356/445 |
| 2002/0052052 A1 | 5/2002 | Robinson et al. | |

FOREIGN PATENT DOCUMENTS

| | | |
|---|---|---|
| JP | 361125038 A | 6/1986 |
| JP | 403012946 A | 1/1991 |
| WO | WO 00/42638 | 7/2000 |
| WO | WO 00/68977 | 11/2000 |

OTHER PUBLICATIONS

IBM Technical Disclosure Bulletin, Mask Alignment for a Capacitative–Servo Disk, Sep. 1988, TDB–ACC–No.: NN8809256, vol. No.:31, Issue No.: 4, p. No. 256–259, Cross Reference: 0018–8689–31–4–256.*

* cited by examiner

*Primary Examiner*—Michael Nghiem
*Assistant Examiner*—Xiuqin Sun
(74) *Attorney, Agent, or Firm*—Knobbe, Martens, Olson & Bear LLP

(57) ABSTRACT

An optical substrate placement device is disclosed employing light from the surface of a rotating substrate in order to generate a signal component which oscillates at the frequency of rotation of the substrate. The magnitude of another signal resulting from filtering the signal component at the frequency of rotation, when processed, reveals whether the substrate is misplaced or "out-of-pocket." Preferred embodiments employ reactor heat lamps as the light source. Methods of detecting whether a substrate is misplaced are also provided.

22 Claims, 4 Drawing Sheets

OUT-OF-POCKET DETECTION SYSTEM USING WAFER ROTATION AS AN INDICATOR

FIELD OF THE INVENTION

The present invention relates generally to the field of substrate fabrication and more particularly to substrate placement detection systems.

BACKGROUND OF THE INVENTION

During the processing of semiconductor wafers, wafer misalignment and wafer movement after placement on a wafer holder (e.g., susceptor) can cause the wafer to be outside the holder's wafer pocket, which is designed to hold the wafer in the correct position as the wafer is rotated. If a wafer is not fully seated in the pocket, the resulting temperature gradients across the wafer can make it unusable. Thus, it is of great importance to detect whether wafers are being processed while they are misplaced or out-of-pocket, in order to take corrective action before the wafer and/or equipment are damaged. In addition, due to the extremely harsh environment inside the process chamber, simplicity and resistance to interference are both highly desirable characteristics, especially with regard to those components of a wafer detection system which are located in the process chamber. Also, reducing the cost of wafer fabrication machines is a major concern in an industry where fabrication processes are machine intensive.

In attempts to solve these problems, the prior art employs sensors for detecting whether a wafer sits flat or inclined within a susceptor pocket. Many of the prior art detection systems employ optical sensors which are subject to interference from the intense and varying light produced by the process chamber heat lamps. Also, the prior art systems are unnecessarily complex and expensive. In addition, conventional detection system components are subjected to the harsh environment, which consequently further increases replacement costs as compared with a simpler system.

Accordingly, a simpler, more accurate, and less expensive wafer placement detection system is needed.

SUMMARY OF THE INVENTION

In accordance with one aspect of the present invention, a substrate position detection system is disclosed comprising an optical sensor operatively linked to a computer. In one embodiment, the optical sensor collects light from a light source as it reflects off the surface of a rotating wafer. As the wafer rotates, the signal from the optical sensor contains a frequency component at the rotational velocity of the wafer. When the wafer is misplaced or out-of-pocket, the magnitude of the frequency component signal at the rotational frequency is much larger than when the wafer is properly seated in the pocket. Methods of measuring whether a substrate is out-of-pocket using reflected light are also provided.

The preferred embodiments of the invention offer several advantages over the prior art. One advantage is that, by coupling the rotation of a wafer with a reflective sensor, the detection system reduces the possibility of inaccurate optical detection caused by the intense, varying light present in a process chamber from the reactor heat lamps. In addition, the integration of the invention with existing hardware has minimal impact on the hardware and is less expensive than prior art systems. Also, preferred embodiments add only one component near the harsh process chamber environment, which further reduces the installation and replacement costs of such high wear components.

For the purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENTS

Although "wafer" may be referred to in specific embodiments it should be understood that the present invention has wide applicability and includes applications where it is desirable to determine whether a given substrate or workpiece is properly aligned and level within a processing environment.

Figure 1A:
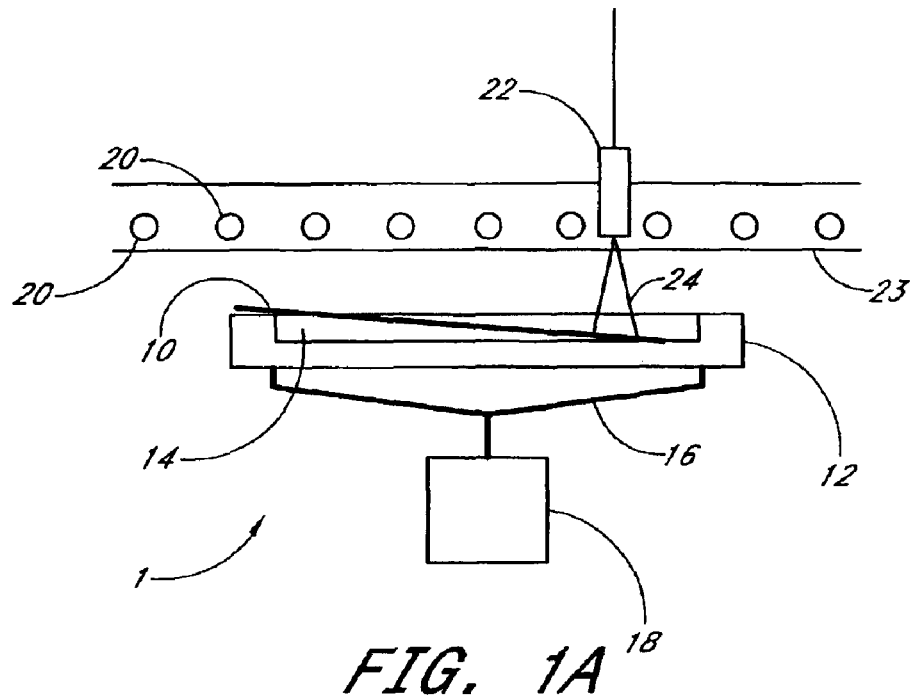
FIG. 1A is a side view of a wafer placement detection system, constructed in accordance with a preferred embodiment of the present invention, showing the relative position of an improperly seated, out-of-pocket wafer.

Referring to FIG. 1A, a process chamber 1 is shown having a wafer out-of-pocket detection system. A misplaced or "out-of-pocket" substrate or wafer 10 sits upon a substrate holder or susceptor 12 having a wafer pocket 14. A wafer pocket 14 is configured so that a properly placed wafer may sit completely within the wafer pocket 14, preferably with a wafer edge clearance of no more than about 3 mm within the wafer pocket 14, more preferably no more than about 2 mm. Thus, the pocket 14 is sized to accommodate a particular class of substrate (e.g., 200 mm wafer or 300 mm wafer).

The susceptor 12 is mounted on a support 16 which is operably linked to a motor 18. The motor 18 is capable of driving the support 16, which in turn rotates the susceptor 12 holding the wafer 10.

Above the wafer 10 are lamps 20 that produce heat in the form of light energy in order to aid in the processing of the wafer 10. A portion of the light reflects off the surface of wafer 10. Also located above the wafer 10 is an optical sensor 22, preferably an analog sensor, which is configured to sense light reflected, radiated, or emitted from the surface of the wafer 10 as the wafer 10 is rotated. Preferably, the optical sensor 22 is mounted near one edge of the wafer (i.e., off-center) to allow an effective sensor view 24. A wall 23 formed from a substance which does not substantially inhibit the transmission of light therethrough, such as quartz, preferably separates the lamps 20 and the optical sensor 22 from the inside of the reaction chamber through which reaction gases flow. Although not shown, preferably an additional set of heat lamps, separated from the chamber by another quartz wall defining the bottom of the process chamber 1, is also included.

Preferably, the sensor 22 receives only ambient light, light radiated from the wafer, light from the lamps 20 reflected off of the wafer 10, and more attenuated light reflected off other components in the chamber 1. Desirably, the sensor 22 is shielded from light directly from the lamps 20, such that the sensed light predominantly comprises light from the wafer surface. Additionally, no supplemental light source is used in the illustrated embodiment. However, in view of the present disclosure, the skilled artisan will readily appreciate that the principles and advantages of the systems described herein can also be applied to systems with supplemental light sources, such as a light beam for increasing the intensity of light reflected off the wafer.

Figure 1B:
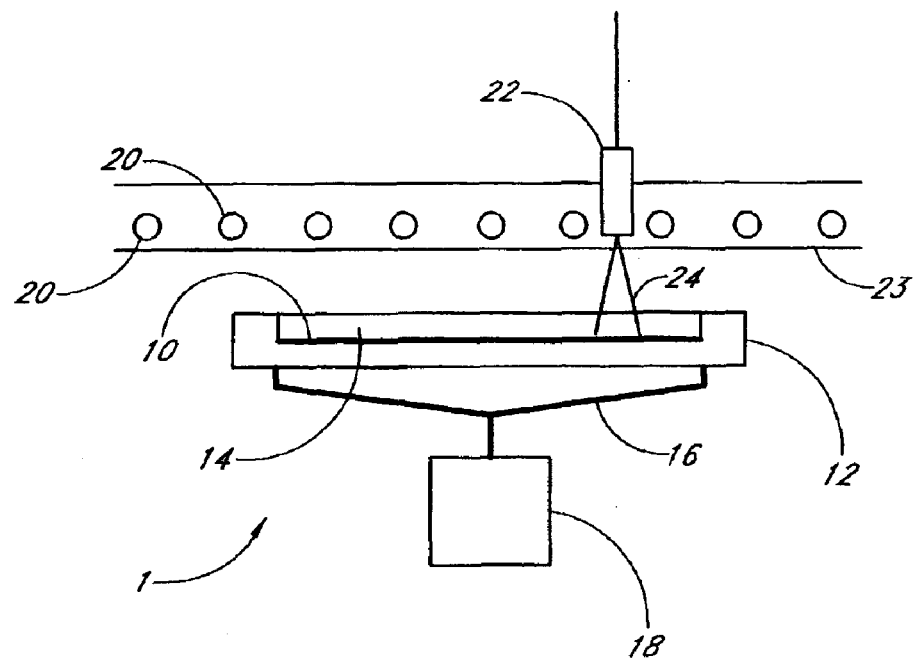
FIG. 1B is a side view of the system shown in FIG. 1A, showing a properly seated wafer shown in the wafer pocket.

FIG. 1B shows the embodiment of FIG. 1A, but shows the wafer 10 seated in the wafer pocket 14 of the susceptor 12. This wafer "in pocket" position is the desired position of the wafer 10 as compared with the misplaced out-of-pocket position illustrated in FIG. 1A.

Figure 2:
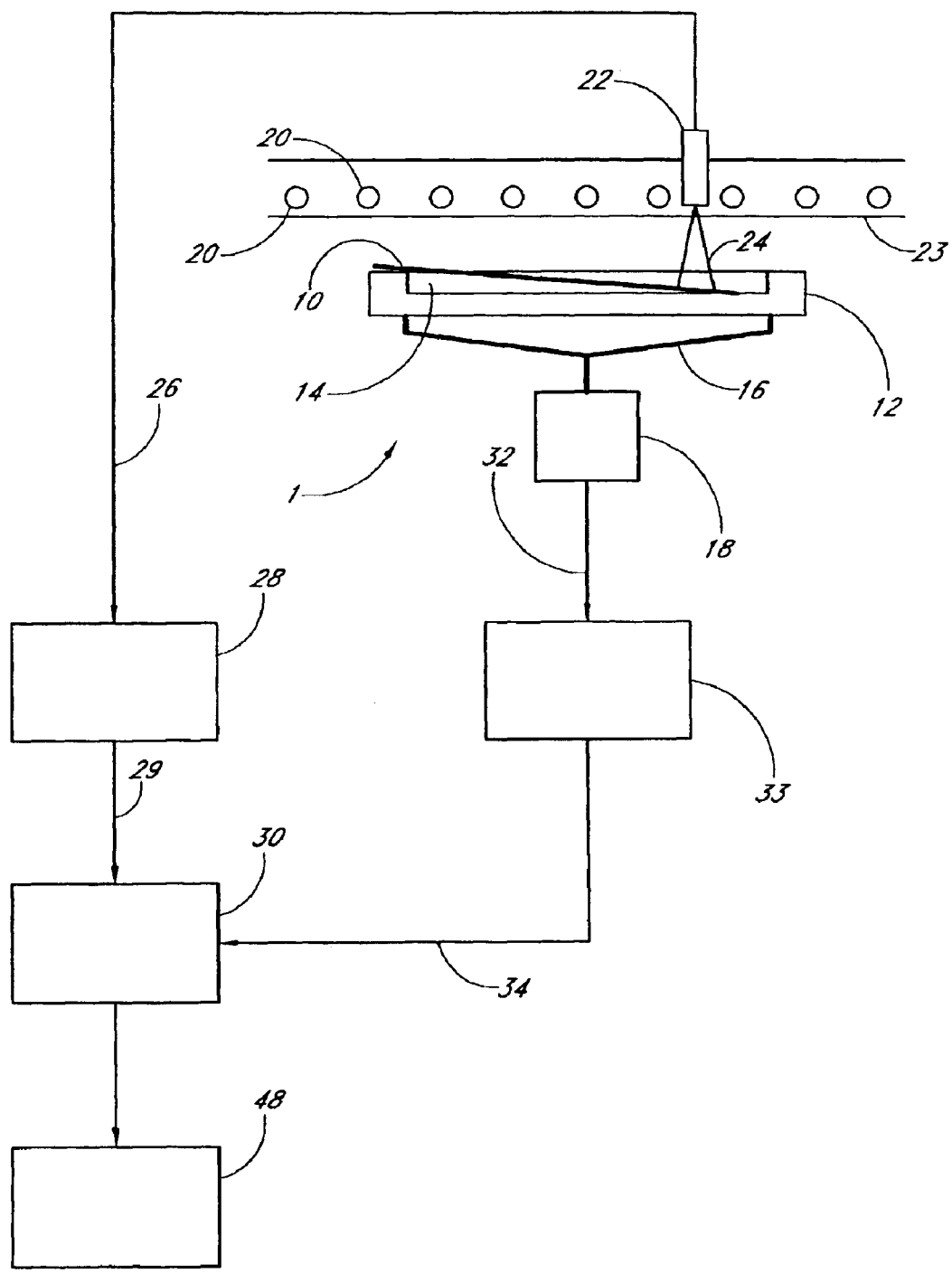
FIG. 2 is a general schematic outline of detection software components used in the wafer placement detection system of FIG. 1A.

Referring to FIG. 2, the wafer placement detection system of FIGS. 1A and 1B is shown along with sensor output signal processing components. The optical sensor 22 is located in a position to receive light reflected and/or emitted from the surface of wafer 10. When the wafer 10 is rotated, the optical sensor 22 produces an output signal 26. This sensor output signal 26 is routed through an analog-to-digital converter 28, yielding a digital signal 29, which is then preferably fed to a processor or computer 30. A rotational frequency signal 32 originating from the motor 18 is preferably routed through an interface 33 and the resultant signal 34 is also fed into the computer 30. Preferably, an optical device (not shown) is incorporated with motor 18 to produce a digital version of rotational frequency signal 32 with the interface 33 preferably being a standard RS232 port interfacing with the computer 30. In alternate embodiments, interface 33 can comprise an incremental encoder or analog-to-digital converter. The computer 30 or processor processes both the optical sensor output signal 26 (by way of digital signal 29) and the rotational frequency signal 32 (by way of signal 34) using software which identifies a pattern matching the rotational frequency (i.e., "frequency component") of the substrate. This frequency component is then preferably further processed (as discussed in greater detail with respect to FIG. 3) to yield an out-of-pocket indication 48 or a misplaced wafer indication. Preferably, if the out-of-pocket indication 48 reveals that the wafer 10 is not seated within pocket 14 properly, then corrective action is taken, such as properly aligning the wafer 10 within the wafer pocket 14. In the alternative, corrective action can comprise removing the misplaced wafer and replacing the "scrapped" wafer with another wafer, which is preferably properly seated. Preferably, if more than one wafer in a row is indicated as being out-of-pocket, then automatic operation is halted in order to perform corrective maintenance.

Figure 3:
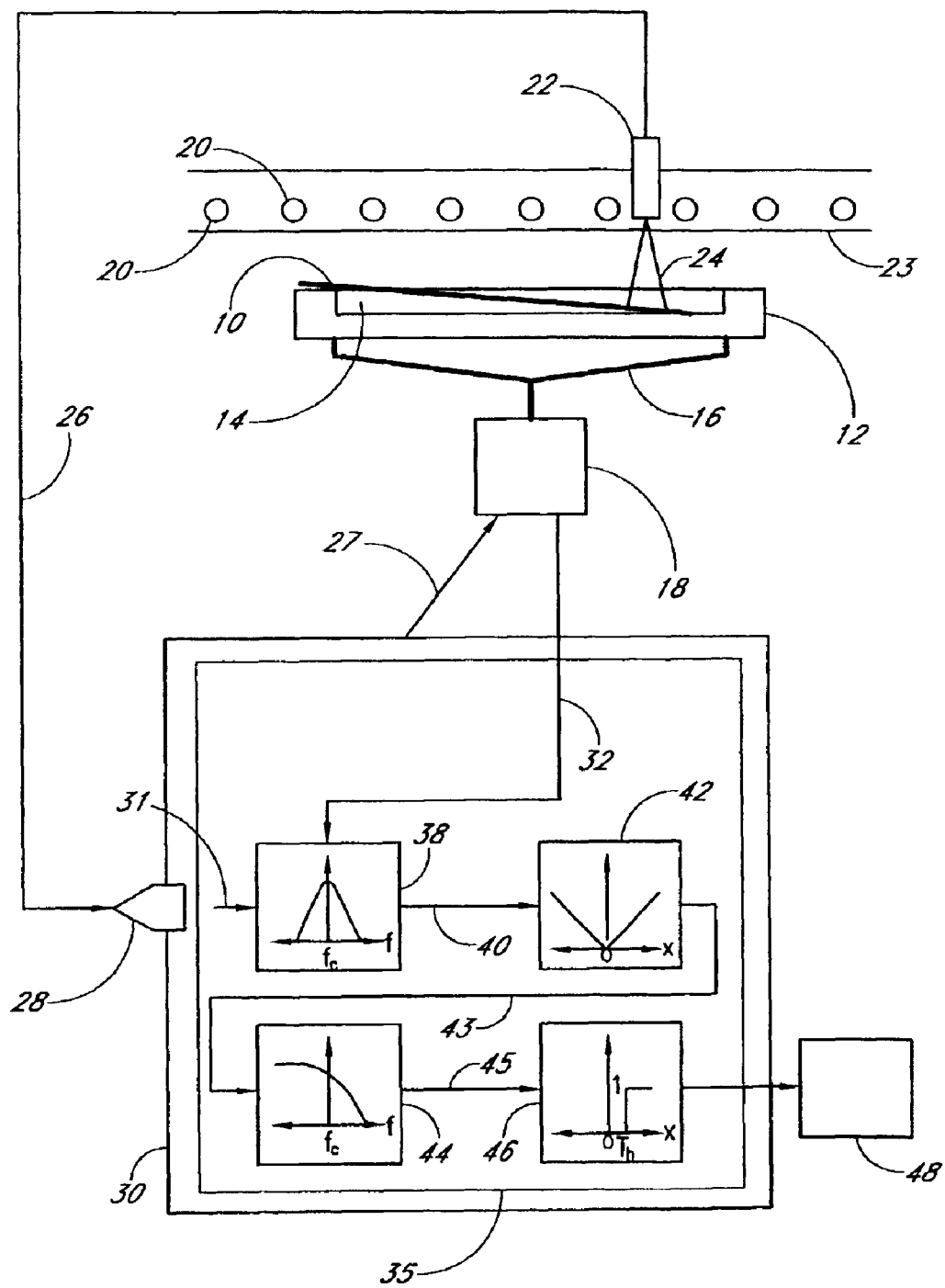
FIG. 3 is a more detailed schematic outline of the system shown in FIG. 2.

Referring to FIG. 3, a more detailed arrangement of the embodiment shown in FIG. 2 is shown, including additional sensor output signal processing components. The optical sensor 22 converts the intensity of the light, preferably produced by lamps 20 and reflected off the surface of wafer 10, into a sensor output signal 26. This sensor output signal 26 is routed to an analog-to-digital converter 28 which interfaces between the optical sensor 22 and a computer 30. The computer 30 also sends a rotational velocity command 27 to the motor 18 which generates an actual rotational frequency signal 32. The actual rotational frequency signal 32 is then sent to the computer 30. The computer 30 processes both the actual rotational frequency signal 32 and the sensor output signal 26 by combining the two signals using one or more algorithms (described below) to provide an out-of-pocket indication to other parts of the software 35. When the wafer 10 is misplaced, the magnitude of the frequency component contained within the sensor output signal 26 is larger than when the wafer is properly seated and level within the pocket 14.

Several different algorithms can be used to filter out "noise," or irrelevant information, from the sensor output signal 26 and further process the desired information. These algorithms serve to extract the signal intensity oscillating at the wafer rotation frequency (i.e., extract a "frequency component") from the sensor output signal 26. Preferably, a digitized sensor output signal 31 is fed into a bandpass filter, preferably a bandpass filter algorithm 38, tuned to the wafer's rotational frequency given by signal 32 in order to extract the frequency component signal 40. The absolute value of the frequency component signal 40 is then preferably determined using an absolute value function 42. A resulting component signal 43 is then further routed through a low-pass filter, preferably a low-pass filter algorithm 44, producing a component signal 45, which is fed to a thresholding algorithm 46. The threshold algorithm 46 processes the incoming signal 45 and determines if the magnitude of the incoming signal at the rotational frequency is sufficient to indicate the wafer is non-level or out-of-pocket. Based on this information, the threshold algorithm 46 then produces an out-of-pocket indication 48. Additionally, the threshold algorithm 46 used to determine the wafer out-of-pocket indication may be modified by an adaptive algorithm (not shown) to minimize the possibility of false indications as a result of such factors as patterns on the wafer. Preferably, if the out-of-pocket indication signal 48 reveals that the wafer 10 is not properly seated in the wafer pocket 14, then processing is halted and corrective action is taken, such as replacement to properly seat the wafer 10 in the wafer pocket 14, scrapping (i.e., removing) and replacing the wafer 10 or performing equipment realignment to correct wafer placement.

Figure 4:
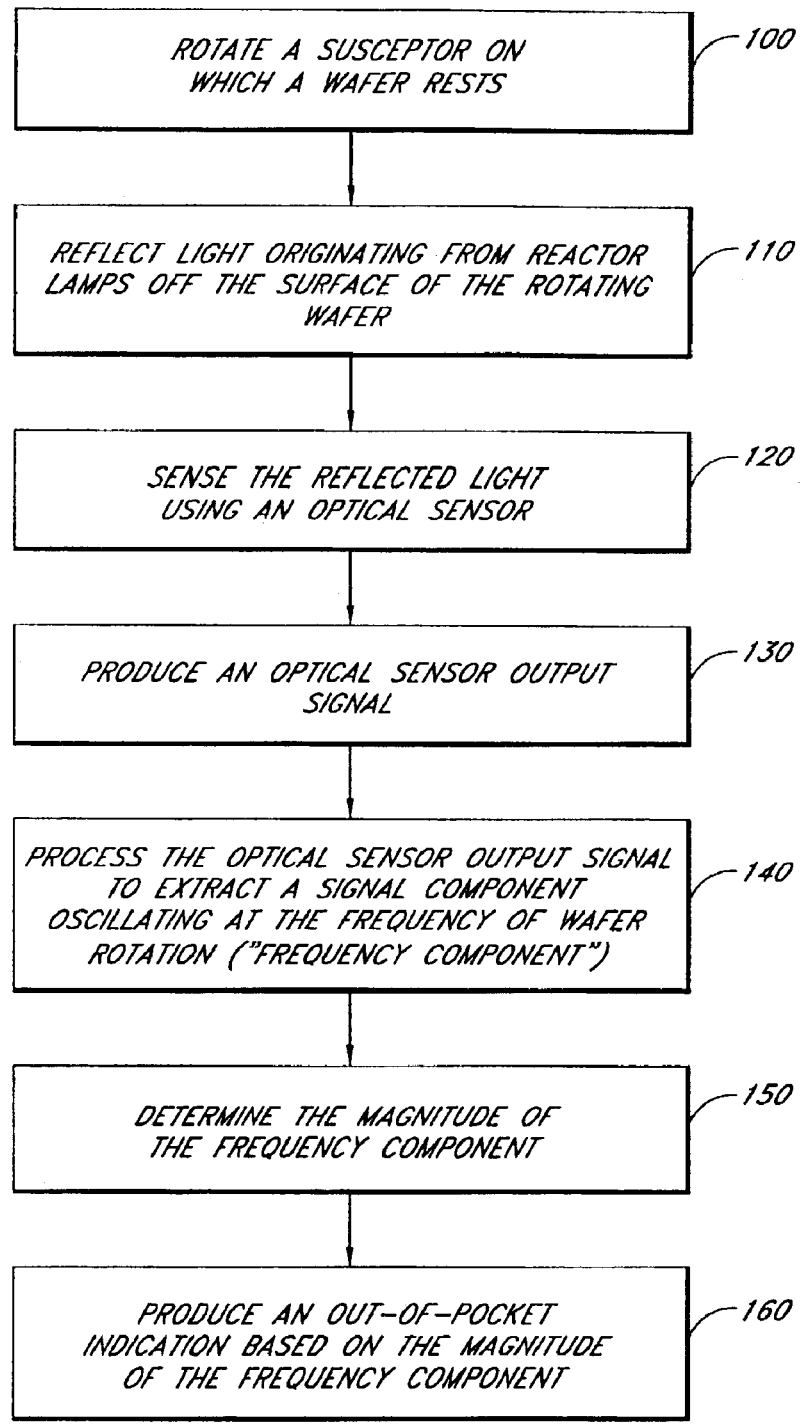
FIG. 4 is a flowchart of a method of determining whether a wafer is properly seated in a susceptor pocket, in accordance with a preferred embodiment of the present invention.

Referring to FIG. 4, a method of determining whether a wafer is properly seated in a susceptor is shown. The wafer is first rotated by rotating 100 the susceptor that supports the wafer. Light originating from reactor lamps is then reflected 110 off the surface of the wafer into an optical sensor. Next, the reflected light is sensed 120 by an optical sensor. The optical sensor output signal is then produced 130. The optical sensor output signal is then processed 140 using a computer or other processor to extract a signal that oscillates at the rotational frequency of the wafer (i.e., "frequency component" signal). The computer or other processor then determines 150 the magnitude of the frequency component. An out-of-pocket indication is produced 160 by comparing the magnitude of the frequency component signal to a predetermined threshold. If the magnitude is above the threshold, this indicates that variation at the rotational frequency is too high and that the wafer is not level. Preferably, if the out-of-pocket indication signal 48 reveals that the wafer 10 is not properly seated in the wafer pocket (e.g., the magnitude of the frequency component is sufficiently high), then processing is halted and corrective action is taken, such as properly seating the wafer in the wafer pocket, removing and replacing the wafer or performing maintenance to correct wafer placement.

An advantage of the preferred embodiment is that, by coupling the rotation of a wafer with a reflective sensor, the detection system reduces the possibility of inaccurate optical detection caused by the intense, varying light present in a reactor from the heat lamps. Another advantage of the preferred embodiment is that the integration of the sensor with existing hardware has minimal impact on the existing hardware. In the illustrated embodiment, it is primarily light from the heat lamps that is used in the illustrated detection system, and no dedicated light source is employed. The illustrated embodiment adds only one component in the harsh process environment (and even that is located exclusively outside the quartz chamber walls), which further reduces the replacement costs of such high wear components, as compared to use of separate light sources.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications thereof. For example, it will be appreciated that advantages of filtering for a signal component at the frequency of wafer rotation can also be obtained when using a separate light beam for the detection process. Additionally, the threshold algorithm used to determine the wafer out-of-pocket indication may be modified by an adaptive algorithm to minimize the possibility of false indications due to patterns on the wafer. Thus, it is intended that the scope of the present invention herein disclosed should not be limited by the particular disclosed embodiments described above, but should be determined only by a fair reading of the claims that follow.

I claim:

1. A substrate placement detection system in a substrate processing tool, comprising:
    a substrate holder having a substrate pocket for holding a substrate;
    a light source located above the substrate;
    a rotation device operatively joined to the substrate holder in order to effectuate the rotation of the substrate holder at a rotational frequency;
    an optical sensor positioned to receive light reflected from the light source off a non-central portion of a surface of the substrate, the optical sensor being configured to generate a measurement signal related to the intensity of the reflected light; and
    a processor configured to receive the measurement signal and a rotational frequency signal indicative of the rotational frequency, the processor further configured to use the rotational frequency signal to identify and extract a component of the measurement signal oscillating at the rotational frequency in order to determine whether the substrate is misplaced.

2. The detection system according to claim 1, wherein the substrate is a silicon wafer.

3. The detection system according to claim 1, further including an analog-to-digital converter through which the optical sensor signal is routed before being fed to the processor.

4. The detection system according to claim 1, wherein the light source is a process chamber heat lamp.

5. The detection system according to claim 1, wherein the light source includes a supplemental light source.

6. The detection system according to claim 1, wherein the processor is a computer.

7. The detection system according to claim 6, wherein the computer is configured to contain a band pass filter tuned to the rotational frequency in order to extract the component signal, the computer being further configured to apply a thresholding algorithm to the component signal to determine whether the wafer is misplaced.

8. A substrate placement detection system in a substrate processing tool, comprising:
    a substrate holder having a substrate pocket for holding a substrate;
    a light source located above the substrate;
    a rotation device operatively joined to the substrate holder in order to effectuate the rotation of the substrate holder at a rotational frequency;
    an optical sensor positioned to receive light reflected from the light source off a non-central portion of a surface of the substrate, the optical sensor being configured to generate a signal;
    a computer configured to extract a component of the sign oscillating at the rotational frequency in order to determine whether the substrate is misplaced, wherein the computer is configured to contain a band pass filter tuned to the rotational frequency in order to extract the component signal, the computer being further configured to apply a thresholding algorithm to the component signal to determine whether the wafer is misplaced;
    an absolute value determining algorithm configured to be applied to the component signal subsequent to the application of the band pass filter; and
    a low pass filter being configured to be applied to the component signal resulting from the application of the absolute value determining algorithm, the low pass filter being further configured to be applied before feeding the component signal to the thresholding algorithm.

9. The detection system according to claim 8, further comprising an adaptive algorithm configured to determine a threshold for the thresholding algorithm to apply in order to reduce false misplaced substrate indications.

10. The detection system according to claim 9, wherein the adaptive algorithm is configured to reduce false misplaced substrate indications primarily due to patterns on the wafer.

11. A method of detecting substrate placement comprising:
    rotating a susceptor, upon which a substrate rests, moving at a rotation frequency;
    receiving an input signal indicative of the rotation frequency;
    detecting light from a surface of the substrate;
    converting the detected light to a signal related to the intensity of the light;
    extracting from the detected light signal a component oscillating at the rotation frequency, wherein the component is extracted, at least in part, by using the input signal; and
    processing and interpreting the component to determine whether the substrate is misplaced, wherein the detected light comprises light from a heat lamp reflected from the substrate surface.

12. The method according to claim 11, wherein the detected light comprises light from a supplemental light source reflected from the substrate surface.

13. The method according to claim 11, wherein the detected light comprises light radiated from the substrate surface.

14. A method of detecting substrate placement comprising:

rotating a susceptor, upon which a substrate rests, at a rotation frequency;

detecting light from a surface of the substrate;

converting the detected light to a signal;

extracting from the detected light signal a component oscillating at the rotation frequency;

processing and interpreting the component to determine whether the substrate is misplaced;

routing a signal representing the detected light through an analog-to-digital converter prior to extracting the component, producing a digital signal;

extracting the component from the digital signal using a band pass filter algorithm;

applying an absolute value determining algorithm to the component signal extracted by the band pass filter algorithm to generate a magnitude of the component;

applying a thresholding algorithm to the magnitude of the component signal produced by the absolute value determining algorithm; and determining whether the magnitude of the component indicates an out-of-pocket condition based on the application of the thresholding algorithm.

15. The method according to claim 14, further comprising producing an out-of-pocket indication signal when the thresholding algorithm indicates an out-of-pocket condition.

16. The method according to claim 15, further comprising taking corrective action when an out-of-pocket indication signal is being produced.

17. The method of claim 11, further comprising measuring rotation of the susceptor in order to generate the input signal.

18. A method of detecting substrate placement, comprising:

rotating a susceptor having a substrate resting thereupon at a rotation frequency;

detecting light reflected off a surface of the substrate from a light source;

generating an optical signal based on the detected light reflected off the surface of the substrate;

generating a rotation frequency signal based on the rotation frequency;

using the rotation frequency signal to extract a variation component from the optical signal, wherein the variation component is oscillating at the rotation frequency; and determining whether the extracted component is above a threshold.

19. The method of claim 18, further comprising generating a misplaced substrate indication when the magnitude of the extracted component exceeds the threshold.

20. A method of detecting substrate placement, comprising:

rotating a susceptor having a substrate resting thereupon at a rotation frequency;

detecting light reflected off a surface of a substrate from a light source;

generating a signal based on the detected light reflected off the surface of the substrate;

processing the signal to extract a variation component oscillating at the rotation frequency;

determining whether the extracted component is above a threshold;

applying an adaptive algorithm for determining the threshold; and generating a misplaced substrate indication when the magnitude of the extracted component exceeds the threshold.

21. The method of claim 20, wherein the adaptive algorithm is configured to minimize false out-of-pocket indications primarily due to patterns on the wafer.

22. The method of claim 21, wherein the adaptive algorithm is configured to minimize out-of-pocket indications.

* * * * *

UNITED STATES PATENT AND TRADEMARK OFFICE
CERTIFICATE OF CORRECTION

| | | |
|---|---|---|
| PATENT NO. | : 6,950,774 B2 | Page 1 of 1 |
| APPLICATION NO. | : 10/347779 | |
| DATED | : September 27, 2005 | |
| INVENTOR(S) | : Donald | |

It is certified that error appears in the above-identified patent and that said Letters Patent is hereby corrected as shown below:

In column 6 at line 26 In Claim 8, delete "sign" and insert --signal--, therefor.

Signed and Sealed this

Twenty-first Day of November, 2006

JON W. DUDAS
*Director of the United States Patent and Trademark Office*